United States Patent [19]

Gottschild

[11] Patent Number: 4,795,076
[45] Date of Patent: Jan. 3, 1989

[54] SOLDERING IRON TIP

[76] Inventor: Wilfried Gottschild, Caspar-Merian-Str. 19, D-6980 Wertheim, Fed. Rep. of Germany

[21] Appl. No.: 129,479

[22] Filed: Dec. 7, 1987

[30] Foreign Application Priority Data

Dec. 8, 1986 [DE] Fed. Rep. of Germany ....... 3641873

[51] Int. Cl.⁴ .............................................. B23K 3/02
[52] U.S. Cl. ..................................... 228/54; 219/229
[58] Field of Search ................... 228/54, 51, 57, 44.7, 228/4.5; 219/229; 501/96

[56] References Cited

U.S. PATENT DOCUMENTS

| | | | |
|---|---|---|---|
| 4,049,506 | 9/1977 | Gilding | 228/54 |
| 4,315,128 | 2/1982 | Matcovich et al. | 228/4.5 |
| 4,659,611 | 4/1987 | Iwase et al. | 501/96 |
| 4,667,867 | 5/1987 | Dobbs et al. | 228/54 |

FOREIGN PATENT DOCUMENTS

| | | | |
|---|---|---|---|
| 666292 | 6/1936 | Fed. Rep. of Germany | 228/54 |
| 705120 | 11/1936 | Fed. Rep. of Germany | 228/54 |
| 2164822 | 7/1973 | Fed. Rep. of Germany | 228/54 |

Primary Examiner—Nicholas P. Godici
Assistant Examiner—Samuel M. Heinrich
Attorney, Agent, or Firm—Hugh Adam Kirk

[57] ABSTRACT

This disclosure concerns an improved tip for a soldering iron comprising a material which is both a good heat conductor, as well as a good electric insulator, such as for example an AlN ceramic. This ceramic may contain one or more metal coatings wettable by the solder used. The ceramic tip may be heated by an electric resistance coil around an extension from the tip and covered with a shield, or the tip may be hollow and have the heating element inside it, preferably adjacent the tip end.

4 Claims, 1 Drawing Sheet

SOLDERING IRON TIP

BACKGROUND OF THE INVENTION

Previously the tips of soldering irons comprised electrically conductive metals such as copper or other metals or metal alloys. These metals, particularly when hot or heated, become heavily scaled and therefore had to be protected by extensive coating materials. Furthermore, the electric heaters for these soldering irons must be electrically isolated from the soldering iron, such as by intermediate layers of electric insulating material.

SUMMARY OF THE INVENTION

Generally speaking, this invention comprises a soldering iron tip, and particularly a tip for an electric soldering iron, which tip is composed of a material which has both a good heat conductivity, as well as a good electrical resistance, such an AlN ceramic. This ceramic can be formed easily into different shapes. Thus the tip may be solid or hollow. One embodiment of a solid tip comprises an axial extension from its conical end, around which extension an electric heating coil may be wound and then covered. One embodiment of a hollow tip may have its electrical heating element or means placed inside the hollow tip. If desired, the tip may be coated with a metal easily wettable with the solder employed.

OBJECTS AND ADVANTAGES

It is an object of this invention to produce a simple, effective, efficient, economic soldering iron tip which is both a good conductor of heat, as well as a good insulator of electricity.

Another object is to produce such a soldering iron tip which does not require a coating to prevent scale collecting thereon.

Another object is to provide an electrically heated soldering iron tip which does not have to be electrically insulated from its heating means.

BRIEF DESCRIPTION OF THE DRAWINGS

The above mentioned and other features, objects and advantages, and a manner of attaining them are described more specifically below by reference to embodiments of this invention shown in the accompanying drawings wherein.

DETAILED DESCRIPTION OF THE EMBODIMENTS

Figure 2:
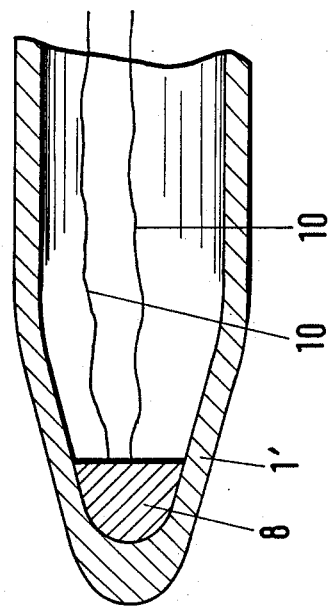
FIG. 2 is a schematic showing in longitudinal cross-section of another embodiment of an electric soldering iron tip in which the heating element is inside the tip.
Figure 1:
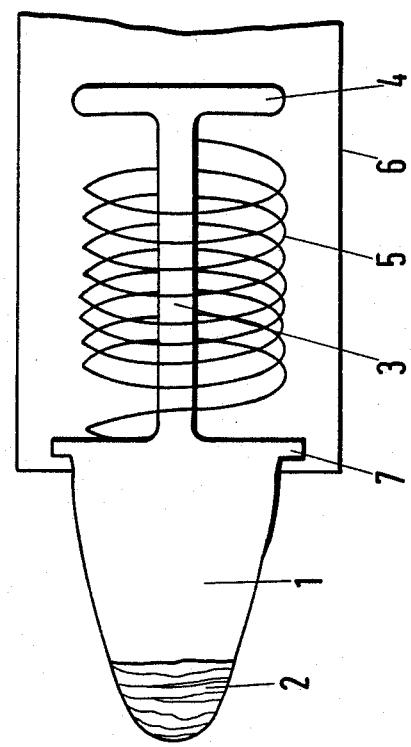
FIG. 1 is a schematic showing of the tip of an electric soldering iron according to one embodiment of this invention, in which the electric heating means is external of the tip.

The tips 1 and 1' shown in FIGS. 1 and 2, respectively, are of an electric soldering iron and comprise an AlN ceramic. The ends of these tips may be provided with one or more metal coatings 2 as shown in FIG. 1, the outer coating of which may be wettable with tin, tin-lead, or similar material wettable by the solder used. AlN ceramic is a ceramic comprising aluminium nitride.

The conical tip 1 shown in FIG. 1 has an elongated shaft-like extension 3 extending axially opposite from the tip end. Opposite ends of this extension 3 are provided with flanges 4 and 7, between which flanges is formed a spool around which an electrical resistance heating coil 5 is wound. The flange 7 adjacent the tip end of the spool also acts as a shoulder-type retainer for a cylindrical housing 6 which covers the coiled spool 3 and 5. Since the material of the tip 1 is a good heat conductor, the heat provided by the coil 5 is conducted to the end of the tip 1, which is made of the same material and integral with the extension 3 and flanges 4 and 7.

The embodiment shown in FIG. 2 shows tip 1' being a hollow cone with the electrical heating element 8 formed inside the tip of the hollow-cone-shaped tip 1'. This heating element 8 is connected and energized by electrical wire conductors 10 extending therefrom inside the hollow tip 1'. In this embodiment the heat from the electrical heating element 8 only has to be conducted through the walls of the hollow tip 1'.

While there is described above the principles of this invention in connection with specific apparatus, it is to be clearly understood that this description is made only by way of example and not as a limitation to the scope of this invention. For instance the preferred material for the tip in general terms is a material having a hexagonal wurzite structure, for instance aluminium-nitride (AlN, as mentioned), silicium-nitride ($Si_3N_4$), boron-nitride (BN) and/or mixtures of these components. If using such a mixture the following composition is preferred:

55 to 65, preferably 60 weight % of AlN and
35 to 45, preferably 40 weight % of BN. Or
55 to 65, preferably 60 weight % AlN,
25 to 35 preferably 30 weight % BN and
5 to 15 preferably 10 weight % $Si_3N_4$.

I claim:

1. A soldering iron tip comprising a material containing at least about 50% by weight of an aluminum nitride ceramic which is both a good heat conductor, as well as a good electrical insulator.

2. A soldering iron tip according to claim 1 wherein said tip includes an electric heating means.

3. A soldering iron tip according to claim 1 wherein said tip has a metal coating.

4. A soldering iron tip according to claim 3 wherein said coating comprises a plurality of metal layers.

* * * * *